Dec. 19, 1944.  L. W. WEESNER  2,365,502
FISHING LURE AND METHOD OF MANUFACTURE
Filed May 15, 1943
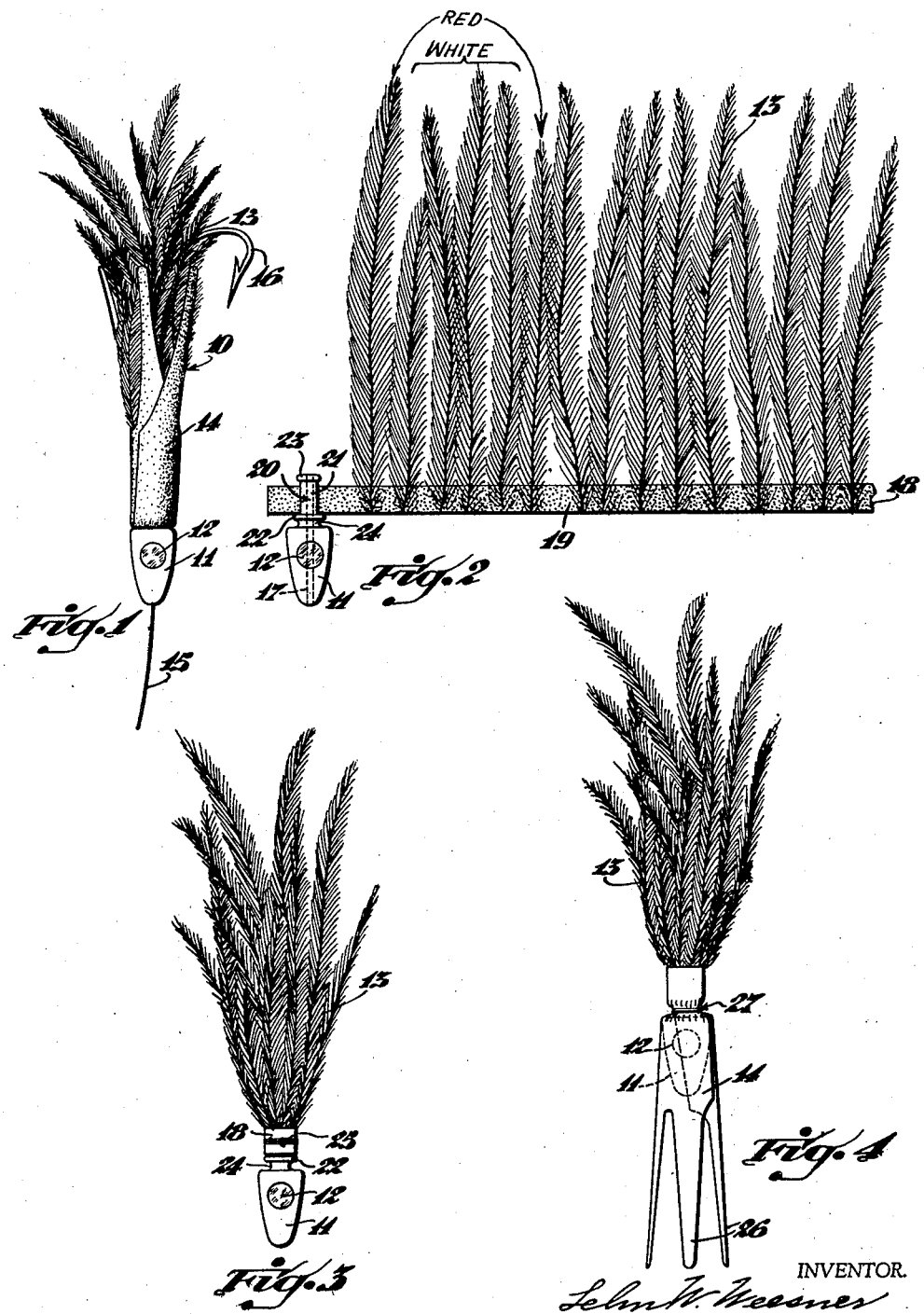

Patented Dec. 19, 1944

2,365,502

UNITED STATES PATENT OFFICE 2,365,502

FISHING LURE AND METHOD OF MANUFACTURE

Lehn W. Weesner, Cincinnati, Ohio

Application May 15, 1943, Serial No. 487,137

6 Claims. (Cl. 43—42)

This invention relates to fishing lures and is particularly concerned with an improved method of assembling a feather body or hackle, and after assembly; affixing the body to a shank member positioned at some appropriate point on the lure. The invention is also concerned with the resulting product.

In the preferred embodiment of the invention which will be hereinafter described, a fishing lure commonly known as a "Jap jig" has been selected as a representative device of the type to which the invention has application. However, the invention also has application to any type of lure which employs as a component part thereof a body of feathers, hair or the like for concealing the hook or attracting the attention of the fish or both. It is not essential that the body be secured to the shank on the head element which is a characteristic construction in a jig and in the case of a casting or trolling lure it may be secured more or less directly to the shank portion of the hook.

Jigs of the type illustrated in the drawing are employed very widely in salt water fishing. The theory of the device is that the fish is attracted by the bright colors and action of the feather body which, for improved results, may be "jigged" up and down in the water. When the fish strikes at the device, the head to which the body is secured is pushed upwardly on the fishing line on which it is slidable and the body thereby receives a minimum of damage from the impact of the fish. At the same time the fish will usually become caught on a hook which is secured to the line at its end and normally positioned directly beneath the head where it is partially concealed by the feathers. This type of device in one form or another has been used for many years by fishermen in many different countries and has enjoyed uniform success, particularly with certain types of salt water fish.

The present improvement is concerned with providing a body of feathers on a fishing lure such as a jig of the type described, the feathers in the body being arranged more evenly and symmetrically and being more firmly secured to the head than has heretofore been possible. The invention also contemplates an improved method of assembling the body on a lure, which method may be performed faster than any heretofore employed particularly if used in conjunction with semi-automatic machinery to which certain steps of the method are well adapted. The resulting product is superior not only in appearance but also in providing a stronger seat for the feathers so that they are less apt to be loosened and torn off by the action of salt water or by the fish.

In assembling a body of feathers for attachment to a shank of a head or hook the practice in the past has been for the worker to select from a pile a number of feathers, possibly four or five, and to hold these feathers manually with one hand against the shank to which they are to be attached. Additional feathers are then selected with the other hand and transferred to the first hand to be positioned at a slightly different point around the periphery of the shank. This process is continued until sufficient feathers have been assembled at which time the worker winds a string or wire tightly around the stem ends of the feathers thereby maintaining them in position more or less permanently. This method is cumbersome and even when performed by a skilled worker results in an irregular positioning of the feathers around the periphery of the shank. If feathers of contrasting colors are employed they will inevitably be arranged heterogeneously as the method does not permit of the possibility of any sort of regular spacing of the feathers of any one particular color.

One of the objects of the present invention has been to provide a feather body in which all of the feathers are arranged in exact uniformity around the shank to which they are attached.

Another object has been to provide a feather body in which feathers of contrasting colors can be arranged in the body with similar uniformity.

Another object has been to provide a body in which the feathers are more tightly secured to the head than has been possible in the prior practices.

Another object has been to provide an improved method of assembling a feather body and a lure member such as a head or hook. The method of the invention is appreciably faster than those heretofore employed even if performed entirely manually. By the employment of semi-automatic machinery to which the method is well adapted the operation can be accelerated still further.

Other and further objects and advantages will be apparent from a consideration of the further and more detailed description of the invention when considered in conjunction with the drawing in which:

Figure 1 is an elevational view of the feather body of the invention embodied in a "Jap jig."

Figure 2 is an elevational view of the feather strip and the head of the jig illustrating the start of the operation of coiling the strip on the shank of the jig head.

Figure 3 is an elevational view of the head with which the strip has been fully assembled to form the feather body.

Figure 4 is a similar view illustrating the attachment of the feather guard to the assembled body and head.

As previously stated, the jig, as illustrated in Figure 1, is only illustrative of a type of lure with which the invention may be employed. This jig which has been designated generally as 10 includes the elements of a head 11, a reflective eye 12 positioned in the head, a body of feathers 13, a feather guard 14, line 15 and a hook 16. The head is traversed by a longitudinal passageway 17 shown in dotted lines in Figure 2 through which a line or leader may be inserted and secured to the hook. This arrangement permits the head to slide upwardly on the line when the lure is struck by a fish and tends to prevent damage to the feather body.

The invention is best illustrated in Figure 2. In this view, 18 represents a fibrous strip such as cellulose tape or the like. In the preferred embodiment illustrated the strip is coated on one side with adhesive 19. It is preferable that the adhesive be pressure sensitive, although water soluble adhesive is permissible. It is not essential that the adhesive be continuous along the strip and, if desired, it may be spotted at the points of attachment of the feather stems. As illustrated in Figure 2, the feathers are secured to the adhesive coated strip at spaced distances. This may be done manually. Preferably the points of attachment are marked on the strip prior to the beginning of the operation.

Where feathers of contrasting colors are employed, these may be spaced at exactly regular intervals, for example, every fifth feather may be red and all the others white. The point of positioning of the red feathers may also be marked in some appropriate way as by a red pencil.

After the feathers have been adhesively secured to the strip, an end of the strip is placed on a shank 20 on the head. This shank includes a neck 21 which should be approximately the same width as the strip and which is positioned between the flange 22 formed on the lower end of the head and the flange 23 formed on the upper end. Thereafter the strip is coiled around the shank convolutely until the desired number of feathers have been attached. This operation may be performed semi-automatically by simple machinery which may be devised for the purpose.

After the desired number of feathers have been wound on the shank the assembly of the head and feather body will appear as illustrated in Figure 3. If desired, a length of wire 25 or a metal clip may be secured around the outer convolution of the strip to provide additional attachment strength. At this point in the operation, if desired, the fibrous material forming the strip may be wholly or partially dissolved in a material which is a solvent for the material of the tape thereby forming an integral mass in which the individual feather stems are imbedded. For example, the strip may be formed from regenerated cellulose, cellulose ethers such as ethyl or methyl cellulose or plastic materials in film or web form, any one of which may be softened to an adhesive state upon the application of a suitable solvent.

Although in its preferred embodiment the invention contemplates the use of a body assembled from feathers it would be possible to apply the principles of the invention to other materials, such as for example the hair bodies used in a "bucktail" lure. In this construction the hairs could be attached individually or preferably in units of several hairs each which could be preassembled for the purpose.

The method of attachment of the feather guard 14 to the head is illustrated in Figure 4. This guard may be formed from oiled silk, dried fish skin or some similar semi-transparent water resistant material. In securing the guard it is first wound around the head with the upper surface approximately level with the upper surface of the fibrous strip and the finger portions 26 depending downwardly beyond the head. A wire or string 27 is then secured around the guard in the neck portion 24. Thereafter the finger portions are pulled upwardly until the guard assumes the position shown in Figure 1 where it will remain due to the stiffness of the material employed. It will be noted that this method of attachment of the guard provides additional strengthening and protection for the coiled fiber strip.

Having fully described my invention, I claim:

1. In a fishing lure, a member providing a shank, a flat strip of fibrous material arranged in convolutions on said shank and a body of feathers of contrasting colors extending from the shank in one direction only, the feathers forming the body being adhesively secured to the strip at spaced points thereon and being disposed between the convolutions of the strip, the feathers of each particular color being arranged with respect to each other on the strip in a symmetrical pattern.

2. The method of securing a body of feathers or the like to a fishing lure having a member providing a shank; said method comprising, securing body units at spaced points along a strip of soluble fibrous material with the stems of the units terminating interiorly of the edges of the strip, coiling said strip and units convolutely around the shank whereby said units are symmetrically disposed around the periphery of the shank and then dissolving the strip material to provide an integral mass in which the units are imbedded and the ends concealed.

3. The method of preparing a feather body for a fishing lure and securing the body to a shank member on the lure, which method comprises, adhesively securing a plurality of feathers of contrasting colors at spaced points along a strip of fibrous material the feathers of each color being arranged with respect to each other in a symmetrical pattern and then coiling said strip convolutely around the shank member whereby the feathers so secured will extend from the shank in a symmetrical color pattern.

4. The method of preparing a feather body for a fishing lure and securing the body to a shank member on the lure, which method comprises the steps of adhesively securing individual feather units at spaced points along a flat adhesive coated strip with the stems of said units positioned interiorly of the edges of the strip and then coiling the strip convolutely around a shank member on the lure, whereby the feathers will extend from the shank in symmetrical arrangement and the stems will be embedded in the coils of the strip.

5. The method of preparing a feather body for a fishing lure and securing the body to a shank member on the lure, which method comprises the steps of marking at spaced points on a flat adhesive coated strip indicia defining a predetermined color pattern, adhesively securing to said strip according to said pattern the stem ends of feathers of contrasting colors and then coiling the strip convolutely around a shank member on the lure.

6. In a fishing lure, a member providing a shank, a flat strip of fibrous material arranged in convolutions on said shank, and a body of feathers extending symmetrically from the shank in one direction only, the stem ends of the feathers forming the body being adhesively secured to the strip at spaced points thereon and being disposed between the convolutions of the strip.

LEHN W. WEESNER.